(12) United States Patent
Boarin et al.

(10) Patent No.: US 11,186,443 B2
(45) Date of Patent: Nov. 30, 2021

(54) PLANT FOR PROCESSING CONTAINERS

(71) Applicant: KOSME S.R.L. UNIPERSONALE, Roverbella (IT)

(72) Inventors: Andrea Giovanni Boarin, Zanè (IT); Gianluca Franceschini, Marmirolo (IT); Paolo Meneghello, Goito (IT)

(73) Assignee: KOSME S.R.L. UNIPERSONALE, Roverbella (IT)

( * ) Notice: Subject to any disclaimer, the term of this patent is extended or adjusted under 35 U.S.C. 154(b) by 0 days.

(21) Appl. No.: 17/225,265

(22) Filed: Apr. 8, 2021

(65) Prior Publication Data

US 2021/0323773 A1 Oct. 21, 2021

(30) Foreign Application Priority Data

Apr. 21, 2020 (IT) .......................... 102020000008479

(51) Int. Cl.
*B65G 54/02* (2006.01)
*B65G 47/04* (2006.01)
*B65G 47/28* (2006.01)
*B65G 47/86* (2006.01)

(52) U.S. Cl.
CPC ............. *B65G 47/04* (2013.01); *B65G 47/28* (2013.01); *B65G 47/842* (2013.01); *B65G 2201/0244* (2013.01)

(58) Field of Classification Search
CPC .. B65G 17/002; B65G 17/34; B65G 21/2009; B65G 23/23; B65G 47/52; B65G 47/64; B65G 47/642; B65G 54/02; B65G 2201/02; B65G 2812/016; B65G 2812/018

USPC ......... 198/465.2, 470.1, 473.1, 474.1, 468.2, 198/619, 805
See application file for complete search history.

(56) References Cited

U.S. PATENT DOCUMENTS 4,817,533 A * 4/1989 Azukizawa ............ B65G 54/02
104/289
4,893,707 A * 1/1990 Langen .................. B65G 17/26
198/626.3
5,261,520 A * 11/1993 Duke ...................... B42C 19/08
198/375

(Continued)

FOREIGN PATENT DOCUMENTS

DE 4133114 A1 4/1993
DE 102015100444 A1 7/2016

(Continued)

*Primary Examiner* — Joseph A Dillon, Jr.
(74) *Attorney, Agent, or Firm* — Pearne & Gordon LLP (57) ABSTRACT

A plant for processing containers (2), comprising a feeding device, a pick-up device (3) and a conveying device (1) interposed between the two, and comprising a gripping unit (7) which comprises a first retaining element (8) and a second retaining element (10) which are slidably coupled to a fixed supporting unit (5), move along it by means of respective linear motor actuators, and which between them define a housing (12) for a container (2), wherein respectively the containers feeding device and/or the containers pick-up device (3) comprise a supporting plate (16) couplable at the bottom to the gripping unit (7), respectively, in a starting station and/or in an arrival station (4), and equipped with one or more raised or raisable portions which are inserted into the housing (12) from below in order to support the container (2) independently of the gripping unit (7).

20 Claims, 9 Drawing Sheets

(56) References Cited

U.S. PATENT DOCUMENTS

| | | | |
|---|---|---|---|
| 6,722,836 B2* | 4/2004 | Jager | B23Q 7/14 |
| | | | 198/358 |
| 6,799,410 B2* | 10/2004 | Gamberini | B65B 59/001 |
| | | | 53/233 |
| 7,137,769 B2* | 11/2006 | Komatsu | B65G 35/06 |
| | | | 414/222.01 |
| 9,061,838 B2* | 6/2015 | van de Loecht | B65G 47/31 |
| 9,079,724 B2* | 7/2015 | van de Loecht | B65G 47/841 |
| 9,403,611 B2* | 8/2016 | Sacchetti | B65G 47/082 |
| 9,527,233 B2* | 12/2016 | Winzinger | B65G 47/846 |
| 9,834,392 B2* | 12/2017 | Raffaini | B65G 47/082 |
| 10,087,018 B2* | 10/2018 | Baechle | B65G 47/28 |
| 10,106,339 B2* | 10/2018 | Prussmeier | H02K 16/04 |
| 10,479,609 B2* | 11/2019 | Peebles | B65G 54/02 |
| 11,097,908 B2* | 8/2021 | Tanaka | H02P 25/06 |
| 11,104,525 B2* | 8/2021 | Campedelli | B65C 9/06 |
| 2012/0260955 A1 | 10/2012 | Winzinger | |
| 2012/0261233 A1 | 10/2012 | Huettner et al. | |
| 2014/0130460 A1* | 5/2014 | Paunesku | B65B 59/003 |
| | | | 53/456 |
| 2015/0136564 A1* | 5/2015 | Hurni | B65B 35/44 |
| | | | 198/418 |
| 2016/0176659 A1 | 6/2016 | Aumann et al. | |
| 2016/0297619 A1 | 10/2016 | Hahn | |
| 2020/0317384 A1* | 10/2020 | Giuliani | B65G 47/91 |
| 2020/0354166 A1* | 11/2020 | Abe | B65H 3/54 |
| 2021/0086938 A1* | 3/2021 | Marcantoni | B65G 54/02 |
| 2021/0122576 A1* | 4/2021 | Jones | B65G 49/05 |
| 2021/0122584 A1* | 4/2021 | Eberhardt | B65G 47/82 |
| 2021/0126517 A1* | 4/2021 | Kleinikkink | H02K 41/0358 |
| 2021/0253374 A1* | 8/2021 | Elsperger | B65G 54/025 |
| 2021/0269259 A1* | 9/2021 | Lasserre | B65G 37/00 |

FOREIGN PATENT DOCUMENTS

| | | |
|---|---|---|
| EP | 1327591 A1 | 7/2003 |
| EP | 1645340 A1 | 4/2006 |
| EP | 2511203 A1 | 10/2012 |
| EP | 2511205 A2 | 10/2012 |
| EP | 3034441 A1 | 6/2016 |
| EP | 3045399 A1 | 7/2016 |
| EP | 3109189 A1 | 12/2016 |
| EP | 3521219 A1 | 8/2019 |
| JP | 2014024665 A | 2/2014 |
| JP | 2018184294 A | 11/2018 |
| JP | 2019119588 A | 7/2019 |
| WO | 9627544 A1 | 9/1996 |
| WO | 9903766 A1 | 1/1999 |
| WO | 200347977 A2 | 6/2003 |
| WO | 2011131704 A1 | 10/2011 |
| WO | 2013185957 A1 | 12/2013 |
| WO | 2013189656 A1 | 12/2013 |
| WO | 2014090581 A1 | 6/2014 |
| WO | 2015036159 A1 | 3/2015 |
| WO | 2015036197 A1 | 3/2015 |
| WO | 2016012171 A1 | 1/2016 |
| WO | 2016102092 A1 | 6/2016 |
| WO | 2019049031 A1 | 3/2019 |
| WO | 2019049032 A1 | 3/2019 |
| WO | 2019082111 A1 | 5/2019 |
| WO | 2019159116 A1 | 8/2019 |

* cited by examiner

PLANT FOR PROCESSING CONTAINERS

This invention relates to a plant for processing containers equipped with a conveying device for conveying containers along a movement path between a feeding device for feeding the containers and a pick-up device for picking up the containers. The containers to which this invention refers may be of any type and made of any material, such as for example glass bottles, plastic bottles, tins, vials, etc.

In the context of this invention the definition plant for processing containers means any plant intended to perform operations on containers, such as for example washing plants, filling plants, labelling plants, capping plants, boxing plants, packaging plants, etc.

Conveying devices for containers have been widely used in this type of plants for decades, and over time many different types of them have been developed.

In recent years, in particular, various conveying devices have been developed which use linear motors for moving gripping units along a movement path. Each gripping unit is generally configured to retain the container while it moves forward along a movement path.

Examples of conveying devices of this type are described in patent documents WO 2013/185957A1, WO 2013/189656A1, JP 2014024665A, WO 2014/90581A1, WO 2015/36159A1, WO 2015/36197A1, WO 2016/12171A1, EP 3034441A1, WO 2016/102092A1, EP 3045399A1, DE 4133114A1, EP 3109189A1, JP 2018184294A, WO 2019/49031A1, WO 2019/49032A1, WO 2019/082111A1, JP 2019119588A, EP 3521219A1, WO 2019/159116A1, WO 96/27544A1, WO 99/03766A1, WO 2003/47977A2, EP 1327591A1, EP 1645340A1, WO 2011131704A1, EP 2511203A1, EP 2511205A2.

In spite of the fact that the solutions proposed until now have always been the most diverse, they have always been solutions targeting a particular application and which, therefore, could only be used for containers of a very precise type in a predetermined context. For example, solutions have been proposed in which the gripping units are equipped with a sort of gripper capable of retaining the neck of a plastic bottle, which could not be used for conveying containers of another type, such as tins or vials.

In this context the technical purpose which forms the basis of this invention is to make a plant for processing containers, which overcomes the above-mentioned disadvantages.

In particular the technical purpose of this invention is to make a plant for processing containers which is equipped with a conveying device for conveying containers which at least in its general structure can be easily adapted to containers of any type and size.

A further technical purpose of this invention is to make a conveying device for conveying containers, which can easily be used in plants for processing containers, for transferring the containers from a first device to a second device.

The technical purpose and the aims indicated are substantially achieved by a plant for processing containers as described in the appended claims. Further features and the advantages of this invention will be more apparent from the detailed description of several preferred, non-limiting embodiments of a plant for processing containers equipped with a conveying device for conveying containers, illustrated in the appended drawings, wherein:

With reference to the above-mentioned figures the reference numeral 1 denotes in its entirety a conveying device according to this invention, configured to convey containers 2 along a movement path.

This invention relates to a plant for processing containers 2 which comprises not just the feeding device 1 for feeding the containers 2, but also a pick-up device 3 for picking up the containers 2 and a conveying device 1.

The appended figures only show the final stretch of the movement path, that is to say, the stretch which ends at the containers pick-up device 3 (arrival station 4), whilst it does not show the initial stretch, that is to say, the one at the feeding device for feeding containers 2 (starting station).

The conveying device 1 comprises a fixed supporting unit 5, which extends along a trajectory of extension, and which, along part of its length, extends parallel to the movement path. In the embodiments illustrated the fixed supporting unit 5 defines a sliding rail 6. In some preferred embodiments the trajectory of extension is closed.

At least one gripping unit 7 is slidably associated with the fixed supporting unit 5, for moving along the trajectory of extension. In some embodiments, the gripping unit 7 moves cyclically along the trajectory of extension, in particular when the latter is closed. However, advantageously, similarly to any other prior art conveying device 1, even the conveying device 1 according to this invention comprises a plurality of gripping units 7 mounted one after another on the fixed supporting unit 5. As is explained in more detail below, each gripping unit 7 is movable independently of the others along the fixed supporting unit 5, meaning, for example, that each unit can move while one or more of the others are stationary, and/or can move with different instantaneous speeds relative to the others. Otherwise, unless the fixed supporting unit 5 is specially configured with multiple parallel paths which allow the gripping units 7 to "overtake" each other, the fact that the gripping units 7 move independently of each other does not mean that they are capable of changing their position relative to each other along the trajectory of extension.

Each gripping unit 7 is configured to retain and move a container 2 along the movement path. Indeed, advantageously, the gripping unit 7 comprises a first retaining element 8, slidably coupled to the fixed supporting unit 5 and comprising a first operating portion 9, and a second retaining element 10, slidably coupled to the fixed supporting unit 5 and comprising a second operating portion 11. In the preferred embodiment each gripping unit 7 is constituted of the assembly consisting of the first retaining element 8 and the second retaining element 10. The first operating portion 9 and the second operating portion 11 are configured to define between them a housing 12 for a container 2 to be moved along the movement path, according to the methods explained in detail below.

The second retaining element 10 is alongside the first retaining element 8, in such a way that the first retaining element 8 and the second retaining element 10 are placed one upstream (after) and one downstream (before) relative to the direction of forward movement along the movement path.

When the trajectory of extension along which the fixed supporting unit 5 extends is closed, an operating stretch and a return stretch are identified in it. The operating stretch is that in which the gripping unit 7 is located while it moves forward a container 2 along the movement path, whilst the return stretch is that along which the gripping unit 7 is located while it returns from the end to the start of the operating stretch. When the first retaining element 8 and the second retaining element 10 move along the operating stretch, the first operating portion 9 and the second operating portion 11 move along the movement path.

The first retaining element 8 and the second retaining element 10 are also independently movable along the fixed supporting unit 5. In particular each of them is movable by means of respective linear motor actuators which are part of the conveying device 1.

Figure 1:
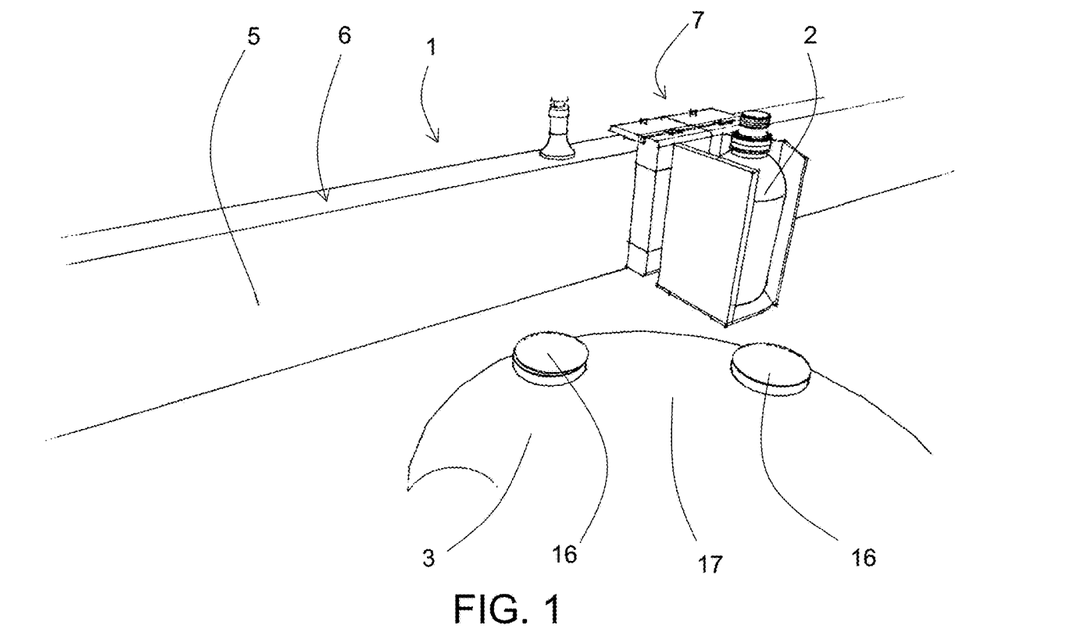
FIG. 1 shows, in a schematic perspective view, part of a conveying device according to a first embodiment of this invention, while it moves forward a container towards a pick-up device for picking up the containers.
Figure 2:
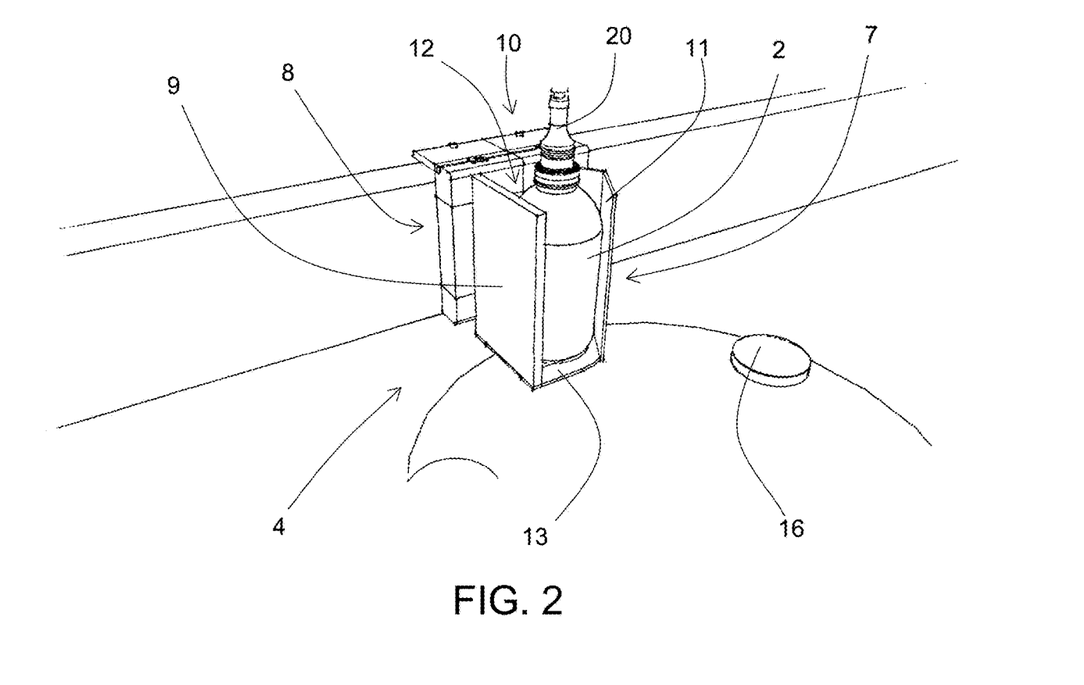
FIG. 2 shows the conveying device of FIG. 1, when the container reaches the pick-up device.
Figure 3:
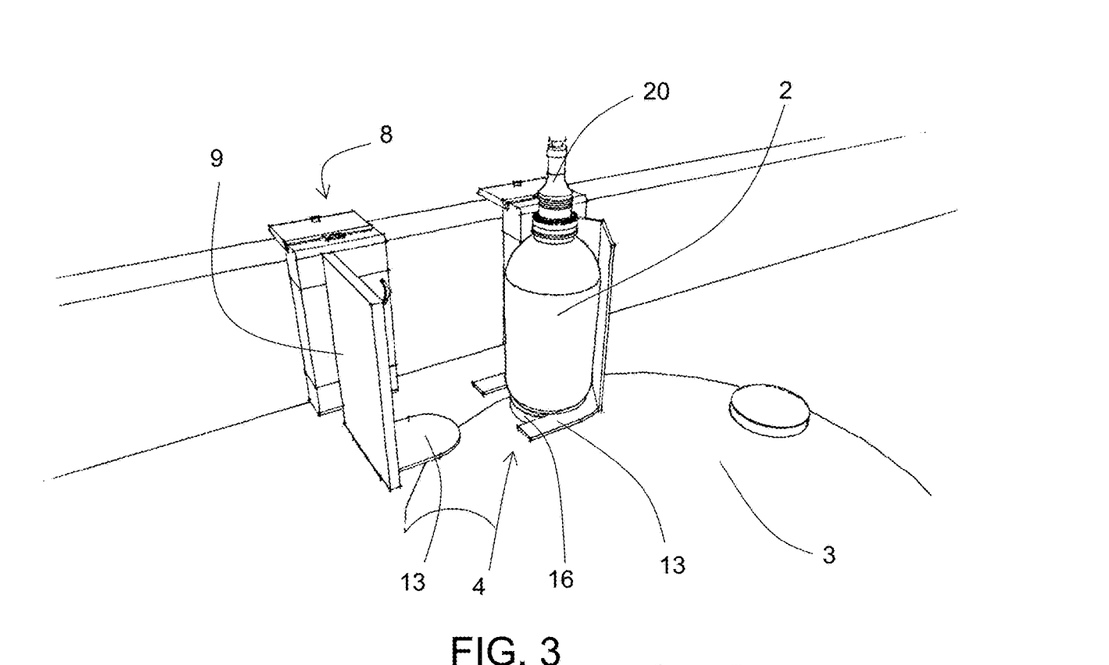
FIGS. 3 and 4 show two successive steps, during which the conveying device of FIG. 2 releases the container to the pick-up device.
Figure 10:
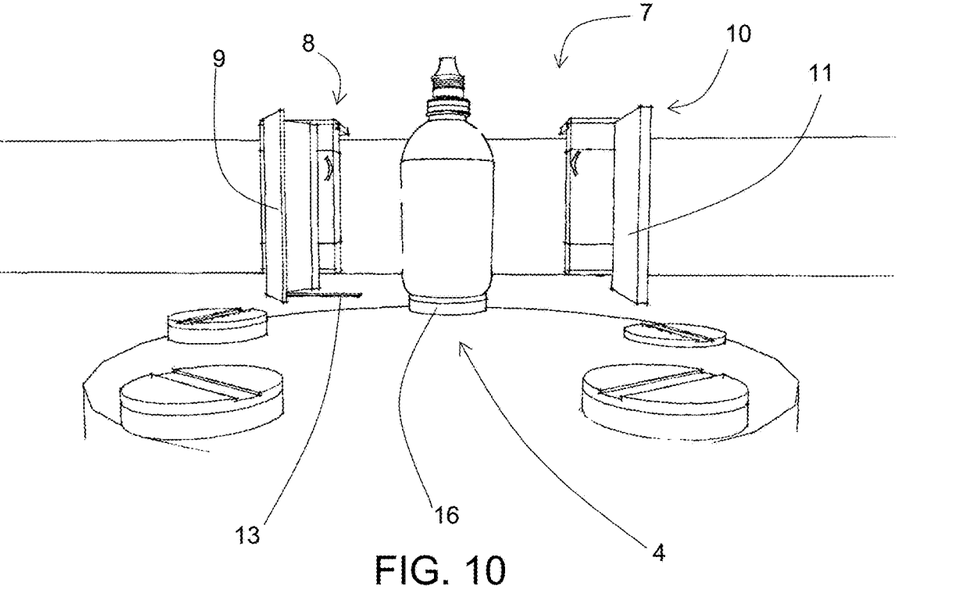
Figure 11:
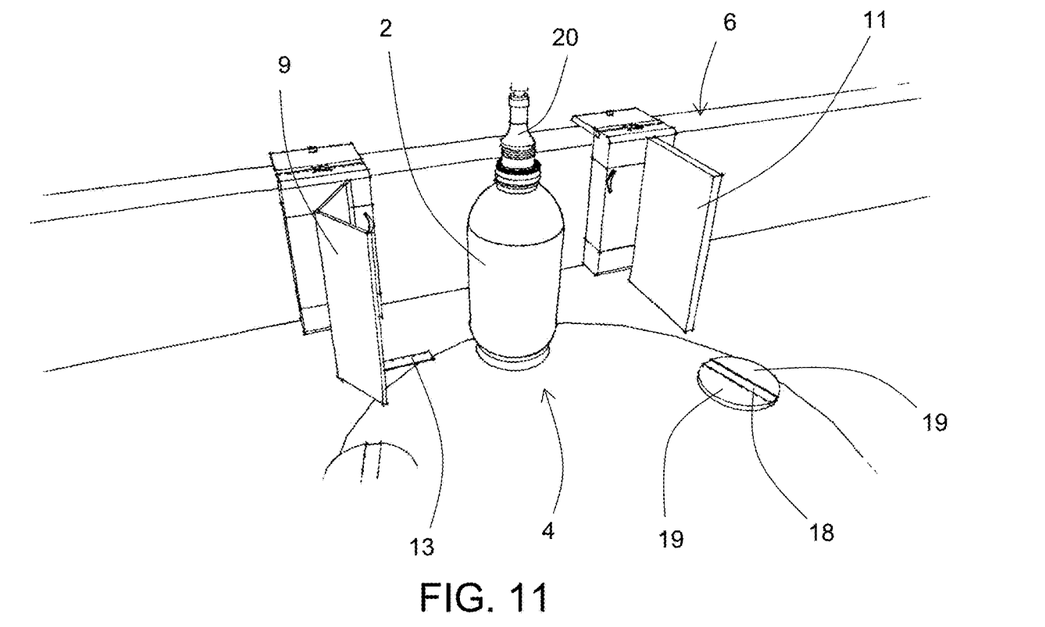
FIGS. 11 and 12 show the conveying device of FIG. 10, from two further different viewpoints.
Figure 12:
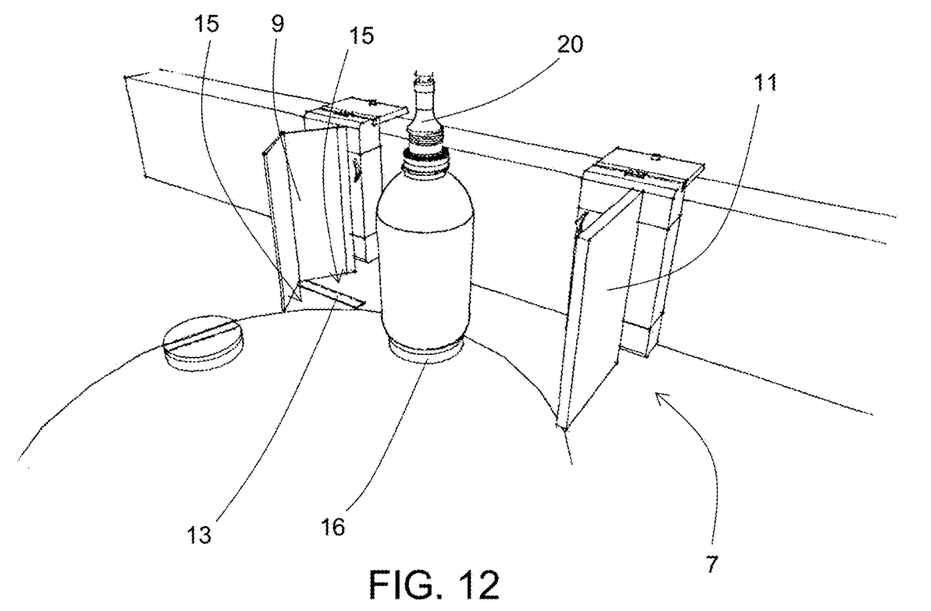
Figure 13:
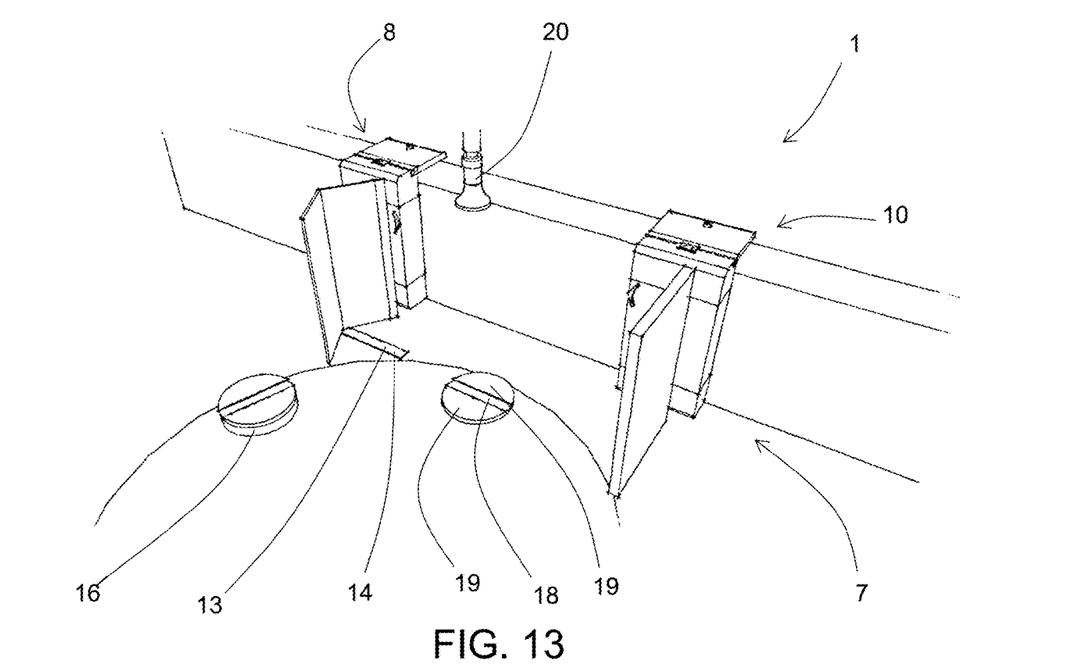
FIG. 13 shows the conveying device of FIG. 12 without the container.
Figure 14:
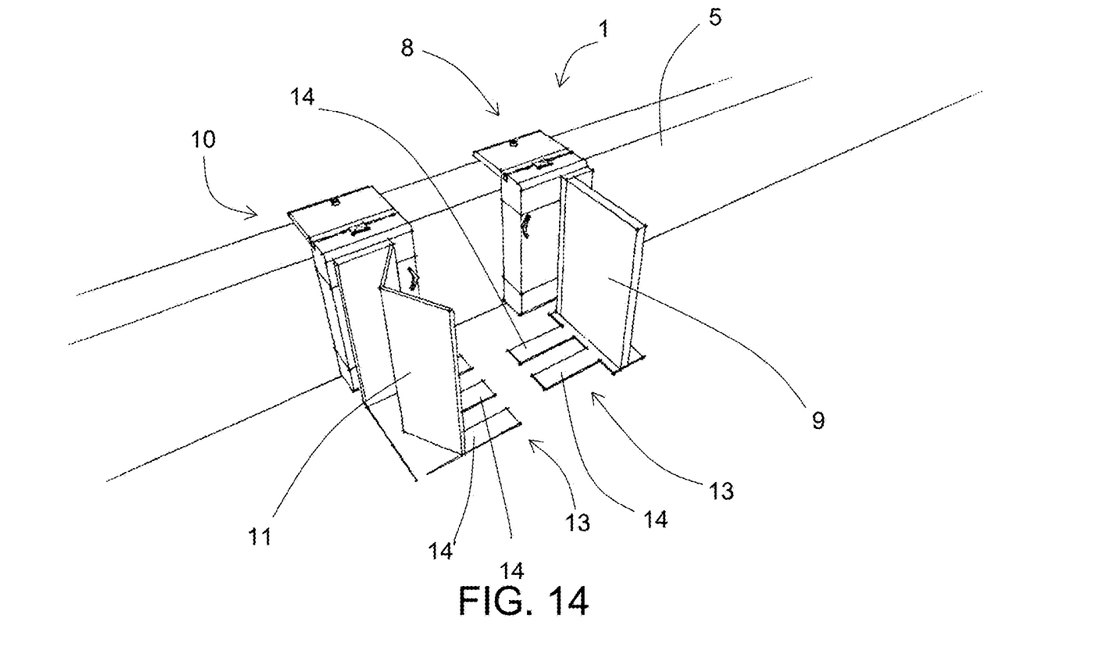
FIGS. 14 and 15 show a fourth embodiment of a conveying device according to this invention.

Although being independently movable, the first retaining element 8 and the second retaining element 10 are coordinated with each other and, by means of their reciprocal movement, independent but appropriately managed, they can switch their reciprocal configuration between an operating configuration, and a home configuration. In the operating configuration (FIG. 2 or 7), the first operating portion 9 and the second operating portion 11 are close together and between them define a housing 12 for a container 2, whilst in the home configuration (FIG. 4 or 10), the first operating portion 9 and the second operating portion 11 are at a distance from each other in such a way as to allow the positioning of a container 2 between them (so that the next switch to the operating configuration can "shut" the container 2 in the housing 12) or to allow a container 2 previously contained in the housing 12 to come out.

In the preferred embodiments, at least at the starting station and/or the arrival station 4 of the movement path, the first operating portion 9 and the second operating portion 11 are positioned alongside the fixed supporting unit 5, below the fixed supporting unit 5, or above it but at a distance from it, in any case sufficient for the space below the housing 12 to remain free.

Indeed, advantageously, the movement path extends between the starting station and the arrival station 4, and at least at the starting station and/or the arrival station 4, the device defines an empty space below the first operating portion 9, the second operating portion 11 (and the supporting portion described below), for allowing the positioning below the gripping unit 7, respectively, of the containers feeding device and/or of the containers pick-up device 3.

Preferably, the first operating portion 9 and the second operating portion 11 switch from the home position, to the operating position, at the starting station of the movement path, remain in the operating configuration when the first retaining element 8 and the second retaining element 10 move along the operating stretch of the trajectory of extension, to move forward the container 2 along the movement path, and they switch to the home configuration when at the arrival station 4 of the movement path.

Advantageously, the first operating portion 9 and the second operating portion 11 are jointly configured in such a way that, when they are in the operating configuration, they at least partly enclose the container 2 preventing it from coming out of the housing 12 sideways. As illustrated in the appended figures, this result may for example be achieved by giving a C, U or V shape (seen in plan view) even to just one of the two; in contrast the other portion may be constituted of a simple flat vertical wall, preferably perpendicular to the movement path. In contrast, in other embodiments, both the first operating portion 9 and the second operating portion 11 may have a C, U, L or V shape In some embodiments the first operating portion 9 and the second operating portion 11 are configured to lock between them the container 2 to be moved, when they are in the operating configuration, preventing movements of the container 2 relative to the housing 12.

In contrast, in other embodiments, the first operating portion 9 and the second operating portion 11 may be configured not to lock between them the container 2 to be moved, when they are in the operating configuration, but to retain it while allowing it the possibility of performing movements relative to the housing 12 (for example rotations about itself).

In some embodiments it is also possible for the first operating portion 9 and the second operating portion 11 to be able to adopt different positions on the respective retaining element 8, 10, and/or for them to be able to change their shape, in order to adapt to containers 2 of different type and size. In particular, it may be the case that they can adopt different positions, in such a way as to vary their distance from each other in the operating configuration, and/or that the one with the C, U or V shape may change its shape by increasing or reducing the inclination of the inclined zones.

In some embodiments it is also possible that the first retaining element 8 and the second retaining element 10 comprise a plurality of interchangeable operating portions 9, 11, for allowing the management of a plurality of containers 2 having different shape and/or size.

According to an optional aspect of this invention, at least one of the first operating portion 9 or the second operating portion 11 also comprises a supporting portion 13 which, in the operating configuration, constitutes a lower support for a container 2 placed in the housing 12 formed between the first operating portion 9 and the second operating portion 11. In other words, the supporting portion 13 constitutes at least part of a bottom wall for the housing 12.

In some embodiments only one of the operating portions 9, 11 comprises the supporting portion 13. In other embodiments, both of the operating portions 9, 11 comprise the supporting portion 13.

In some embodiments in which a supporting portion 13 connected to each operating portion 9, 11 is provided, the supporting portions 13 may have complementary shapes and, jointly, at least partly constitute the bottom wall of the housing 12.

Depending on the design choices the supporting portion 13 (or each supporting portion 13) may adopt different shapes.

In some embodiments, the supporting portion 13 comprises one or more projections 14 which extend cantilever-style mainly along a direction parallel to the movement path. Preferably, those projections 14, seen in plan view, have the appearance of fingers with a cross-section which is constant or decreasing away from the rest of the operating portion to which they are fixed. If both operating portions 9, 11 comprise a supporting portion 13 which has the projections 14, the two supporting portions 13 are advantageously shaped to match each other.

In some embodiments, the supporting portion 13 is also U- or C-shaped and defines a perimetric portion of the bottom wall of the housing 12, intended to support the container 2 at an outer part of the bottom of it. As illustrated for example in FIGS. 4 and 5, depending on the embodiments the U or the C may have different dimensions.

Figure 4:
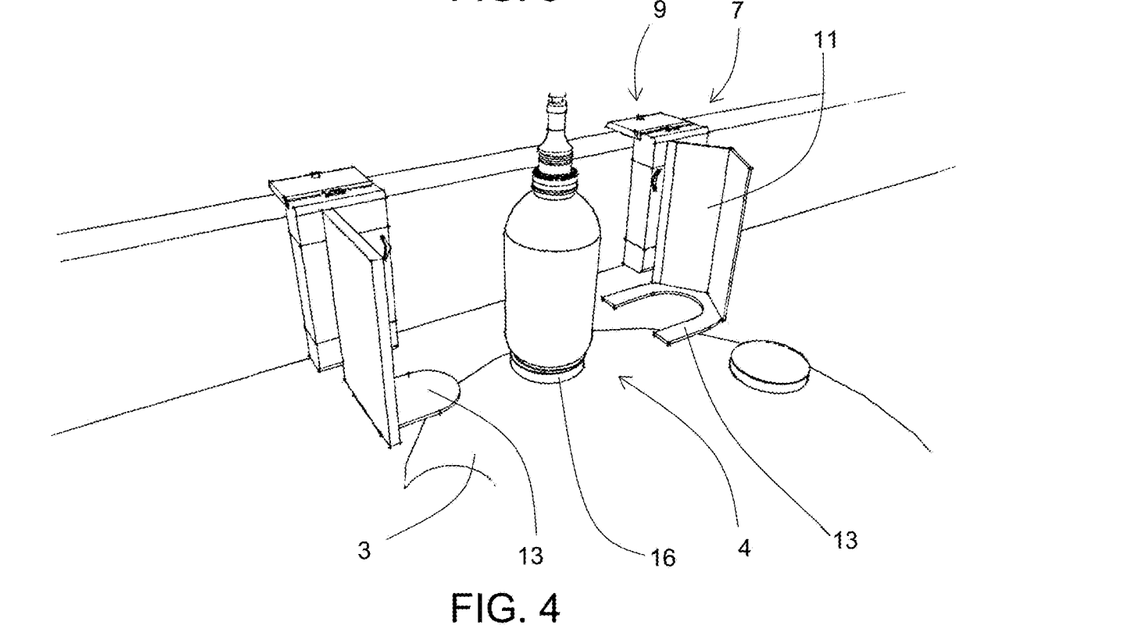
Figure 5:
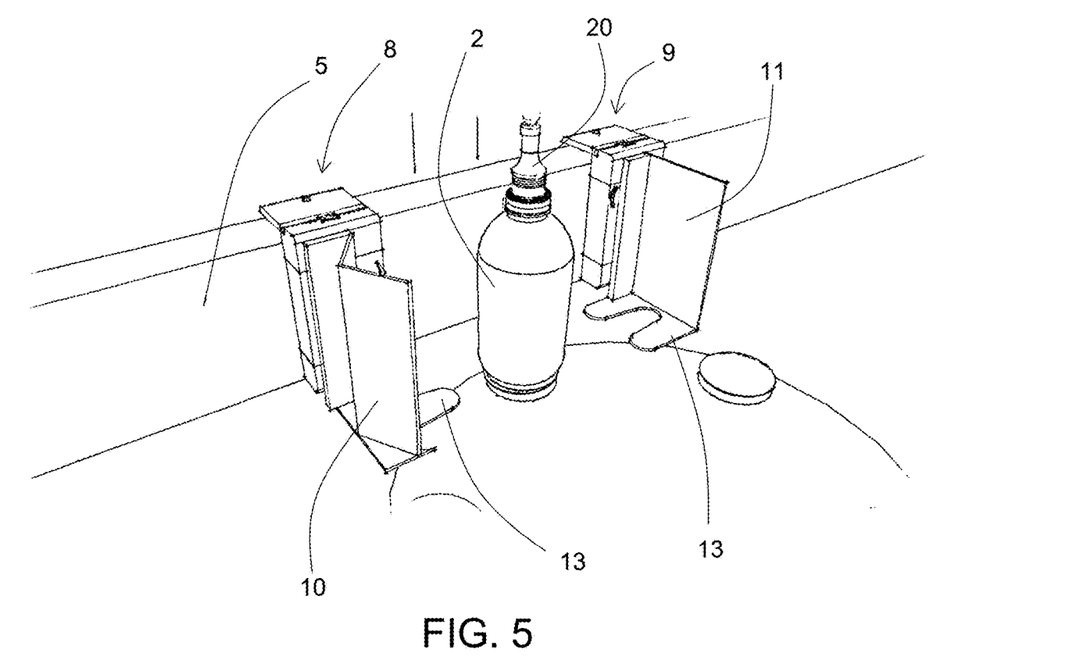
FIG. 5 shows, in a schematic perspective view, part of a conveying device according to a second embodiment of this invention, in a configuration similar to that of FIG. 4.
Figure 6:
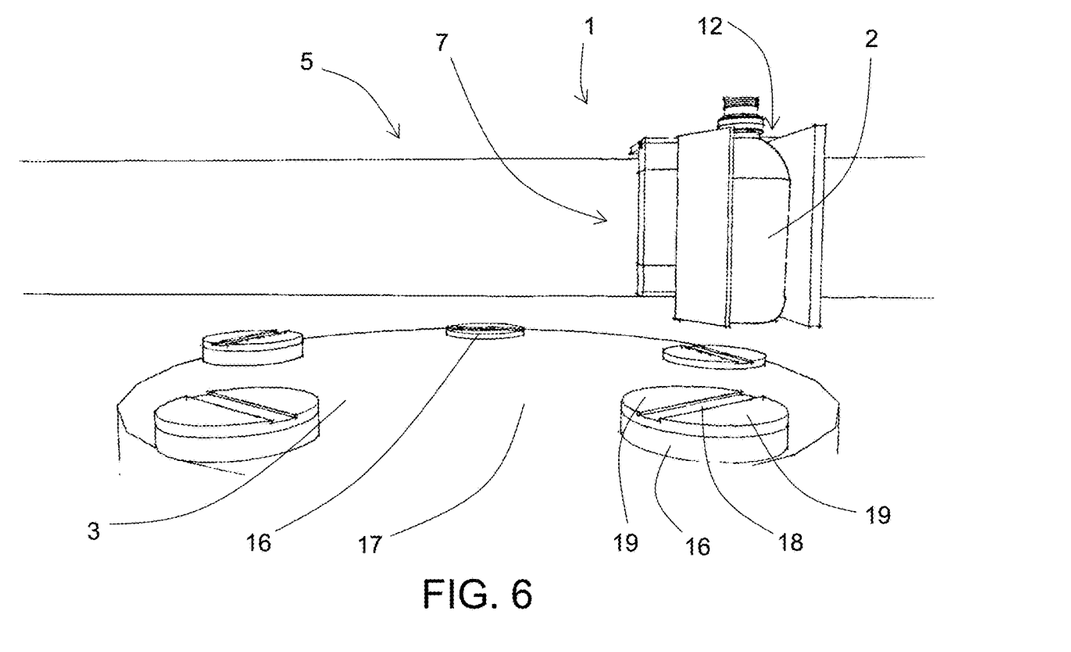
FIG. 6 shows, in a schematic perspective view, a third embodiment of a conveying device according to this invention, while it moves forward a container towards a pick-up device for picking up the containers.

In some embodiments there may be a supporting portion 13 in only one operating portion, being U- or C-shaped, whilst in other embodiments there may also be a second supporting portion 13 in the other operating portion, configured to fill the space at the centre of the U or C (see FIG. 4 or 5).

In some embodiments the supporting portion 13 is rigidly connected to the rest of the first operating portion 9 or of the second operating portion 11 of which it is a part.

In contrast, in some embodiments the supporting portion 13 is connected to the rest of the first operating portion 9 or of the second operating portion 11 of which it is a part, with one or more degrees of freedom. In particular, the supporting portion 13 may be movable relative to the rest of the first operating portion 9 or of the second operating portion 11 of which it is a part, around a vertical axis of rotation and/or along a horizontal direction of translation transversal or perpendicular to the movement path.

Providing a movable supporting portion 13 is particularly advantageous when the movement path follows a curved trajectory, especially if both the first operating portion 9 and the second operating portion 11 comprise a supporting portion 13 and the two supporting portions 13 are coupled to each other.

The supporting portion 13 only partly closes the bottom of the housing 12, that is to say, defining a bottom wall which is incomplete or which has openings 15. That is advantageously implemented in such a way that, in the operating configuration, the housing 12 is partly open at the bottom, to allow the insertion into the housing 12 from below, of units suitable for interacting with the container 2 contained in the housing 12 itself; moreover, preferably, the supporting portion 13 is shaped in such a way that the respective operating portion 9, 11 can be switched between the operating configuration and the home configuration, while those units are inserted into the housing 12 from below and interact with the container 2; for that purpose it is necessary that the open spaces 15 into which those units are inserted are not completely surrounded by the supporting portion 13, instead being laterally open at least at the side directed towards the other operating portion. This embodiment is particularly preferred when such units are units for loading or unloading the container 2 into/from the housing 12, for example as in the embodiment of FIGS. 6 to 13.

Therefore, advantageously, the supporting portion 13 is configured to couple to the containers feeding device at the starting station of the movement path, and to the containers pick-up device 3 at the arrival station 4 of the movement path. At the same time, the supporting portion 13, if present, allows respectively the feeding device and/or the pick-up device 3 to interact with the bottom of the container 2, to support it from below respectively during the feeding to the housing 12 and/or during the pick-up from the housing 12.

In some embodiments in which only one supporting portion 13 is present, advantageously the supporting portion 13 is part of the retaining element 8, 10 which is placed after, relative to the direction of forward movement of the container 2 along the movement path.

Figure 15:
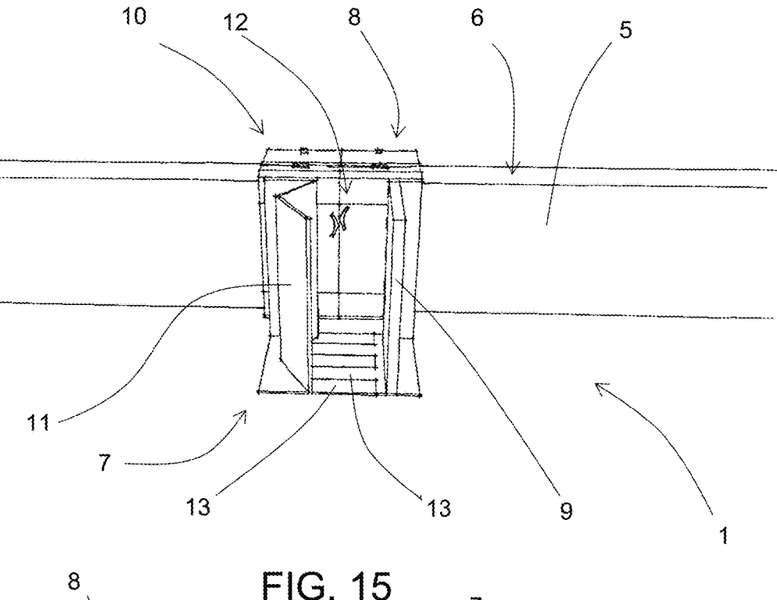
Figure 16:
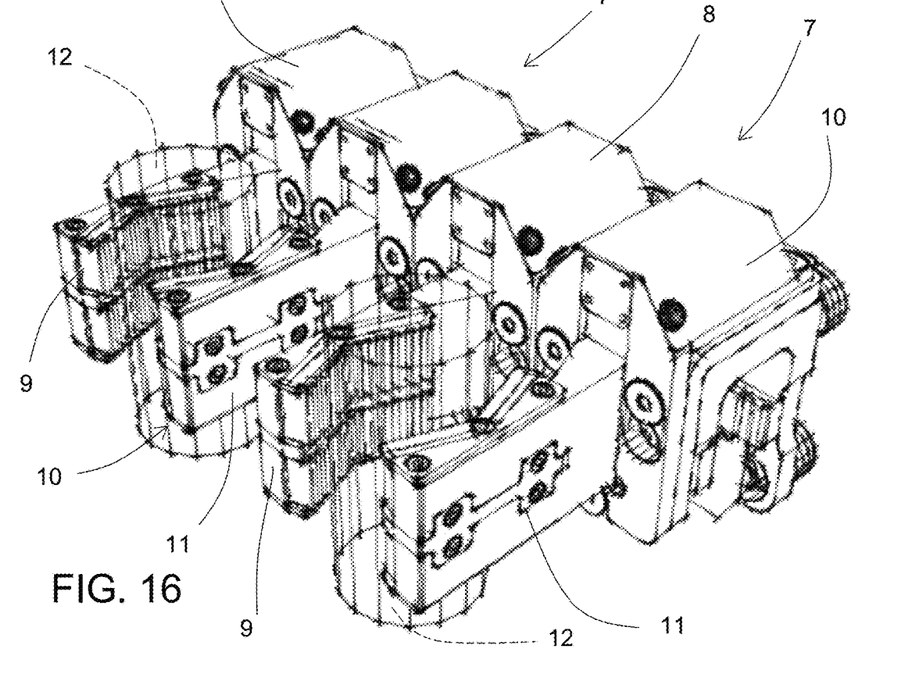
FIG. 16 shows, in a schematic perspective view, two gripping units of a fifth embodiment of a conveying device according to this invention (with the containers conveyed only sketched)
Figure 17:
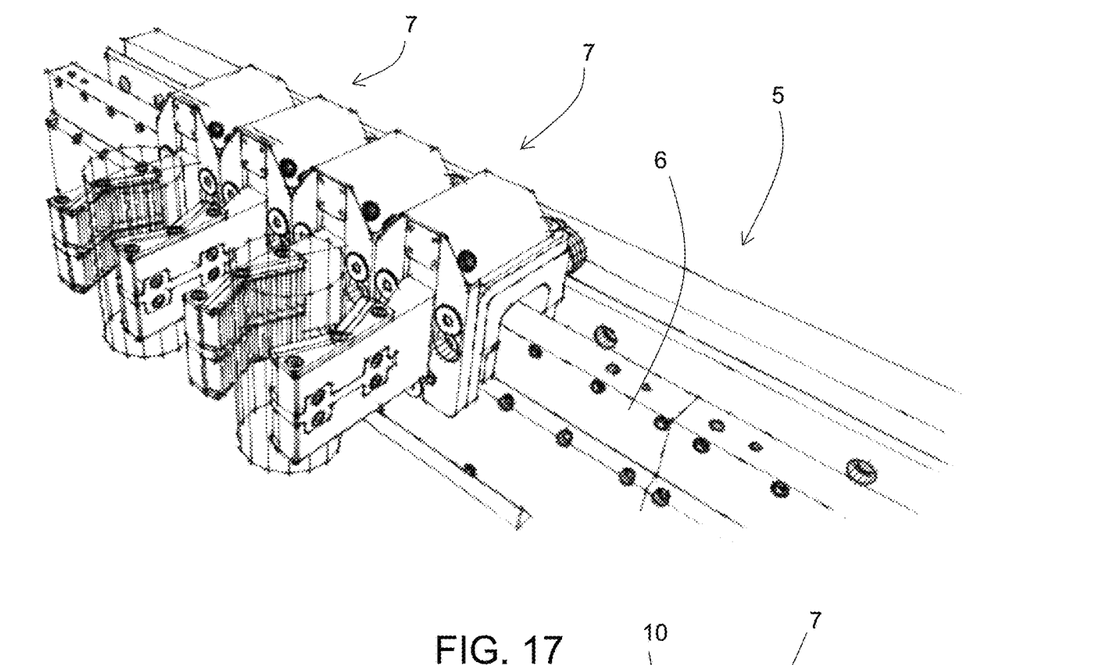
FIG. 17 shows, in a schematic perspective view, the two gripping units of FIG. 16 mounted on a fixed supporting unit.
Figure 18:
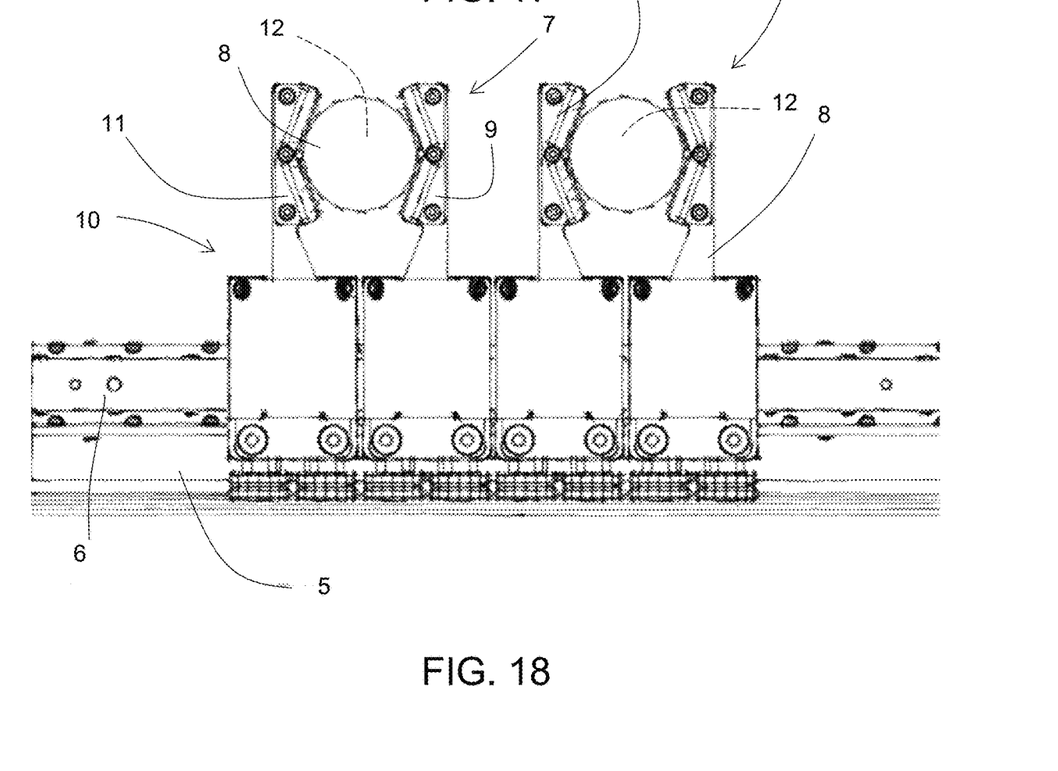
FIG. 18 shows the elements of FIG. 17 in a top view.

In contrast, in some embodiments, the housing 12 is completely open at the bottom and the first operating portion 9 and the second operating portion 11 are configured to lock between them the container 2 to be moved by acting exclusively on a lateral surface of the container 2. An example of this type is shown in FIGS. 15 to 17, which illustrate two adjacent gripping units 7. The first retaining element 8 and the second retaining element 10 of each gripping unit 7 are illustrated clamped on a container 12, whose outer dimensions are the only part of it shown. The clamping is caused only by the force that each retaining element 8, 10 applies on the container by means of the first and second operating portions 9, 11. As can easily be inferred, although they are very near each other, in the operating configuration between the first retaining element 8 and the second retaining element 10 a gap will always be present, if necessary even just a few millimetres.

The conveying device 1 is interposed between the containers feeding device and the containers pick-up device 3, and the movement path extends between a starting station, at the containers feeding device, and an arrival station 4, at the containers pick-up device 3.

In more detail, at the starting station, the containers feeding device is coupled to the conveying device 1, in order to position a container 2 between the first operating portion 9 and the second operating portion 11. In the preferred embodiments that happens while the first retaining element 8 and the second retaining element 10 are in the home configuration; however in other embodiments it is possible that the container 2 is fed directly into the housing 12 formed by the first operating portion 9 and by the second operating portion 11 in the operating configuration (this is possible when the first operating portion 9 and the second operating portion 11 are not configured to lock the container 2 when they are in the operating configuration).

At the arrival station 4, the conveying device 1 is coupled to the containers pick-up device 3 in order to release, to the pick-up device 3 for picking up containers 2, the container 2 contained in the housing 12. Advantageously, the release occurs when the first retaining element 8 and the second retaining element 10 switch from the operating configuration to the home configuration.

Both the feeding device, and the pick-up device 3, may adopt the most suitable structure depending on requirements. Furthermore, each type of pick-up device 3 may also be used as a feeding device: it is sufficient that in the two cases operation is inverted.

In one embodiment, the feeding device may be constituted of a robotic arm suitable for positioning the container 2 in the correct position, between the first operating portion 9 and the second operating portion 11 If, when they arrive in the starting station, the first operating portion 9 and the second operating portion 11 are in the home configuration, or are in the operating configuration but switch to the home configuration in order to allow the loading of a container 2, the conveying device 1 is configured to switch the first retaining element 8 and the second retaining element 10 to the operating configuration, while the first operating portion 9 and the second operating portion 11 are still at the starting station, and after the containers feeding device has positioned the container 2 between the first operating portion 9 and the second operating portion 11.

Advantageously, the switching may occur by adopting specific methods, which allow unwanted movements by the container 2 to be avoided. For example, if only one of the two operating portions 9, 11 is equipped with the supporting portion 13, the switching from the home configuration to the operating configuration may advantageously occur by bringing the operating portion 9, 11 without supporting portions 13, to rest on or near to the container 2, and then moving the other operating portion 11, 9 until it reaches the operating configuration, thereby forcing insertion of the supporting portion 13 below the container 2. This method of proceeding may be particularly useful if the supporting portion 13 must be forcibly inserted below the container 2.

At the arrival station 4, the conveying device 1 is in contrast configured to switch the first retaining element 8 and the second retaining element 10 from the operating configuration to the home configuration.

In the embodiments in which the bottom wall of the housing 12 is open to allow the insertion of something from below, the containers feeding device and/or the containers pick-up device 3 may comprise a lifting element for lifting the container 2, shaped in such a way that it can be inserted into the housing 12 from below through the spaces left free by the supporting portion 13.

In some embodiments, the feeding device and/or the pick-up device 3 may comprise a supporting plate 16 couplable at the bottom to the gripping unit 7 (respectively in the starting station and/or in the arrival station 4). In turn, the supporting plate 16 comprises one or more raised or raisable portions, which can be inserted into the housing 12 from below in order to support the container 2 independently of the gripping unit 7.

An example of this type is schematically illustrated in the appended FIGS. 6 to 13 in which the pick-up device 3 is constituted of a plate carrousel 17, in which each supporting plate 16 is vertically movable relative to the carrousel 17, can rotate relative to the carrousel 17 around its own central axis, and can rotated together with the carrousel 17 around the central axis of the carrousel 17.

The supporting portion 13 has a rectangular plan with the long side significantly larger than the short side, whilst the supporting plate 16 has a circular plan as a whole with a diameter such that it can be inscribed in the housing 12 formed between the first operating portion 9 and the second operating portion 11.

The supporting plate 16 has a central diametral channel 18 (which seen in plan view has the shape of a circular segment with two bases) which separates two specular contact portions 19, each with a plan having the shape of a circular segment with one base. The channel 18 has a depth equal to or greater than the thickness of the supporting portion 13, in such a way that the supporting portion 13 can be completely contained in the channel 18. Furthermore, the supporting plate 16 is vertically movable between a lowered position in which the contact portions 19 are placed at a height lower than the supporting portion 13 and the operating portions 9, 11 (FIG. 7), and a raised position in which the supporting portion 13 is inserted into the channel 18 and the contact portions 19 project inside the housing 12 (FIG. 8).

Figure 7:
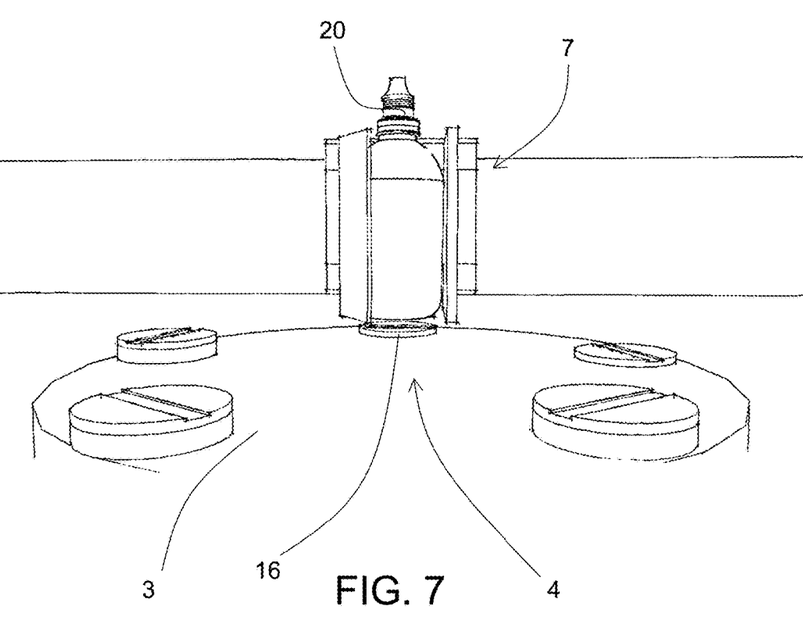
FIG. 7 shows the conveying device of FIG. 6, when the container reaches the pick-up device.
Figure 8:
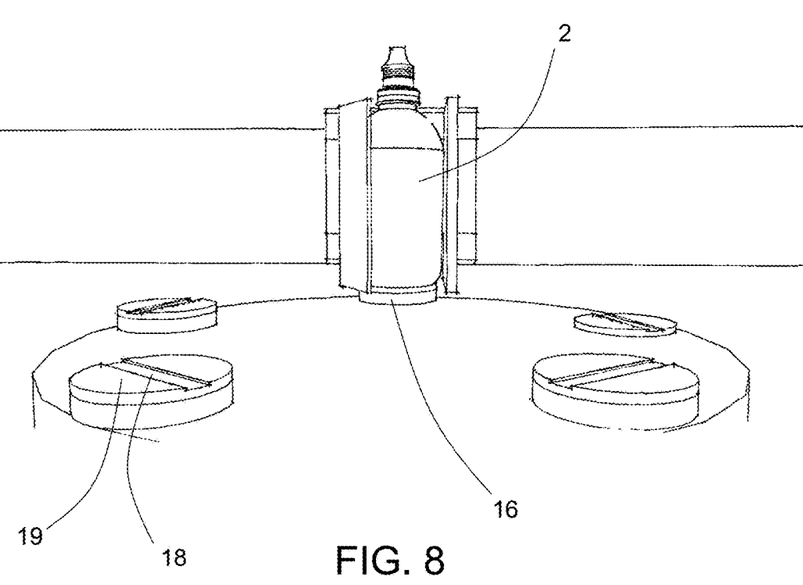
FIG. 8 shows the conveying device of FIG. 7, after a plate of the pick-up device has been lifted.
Figure 9:
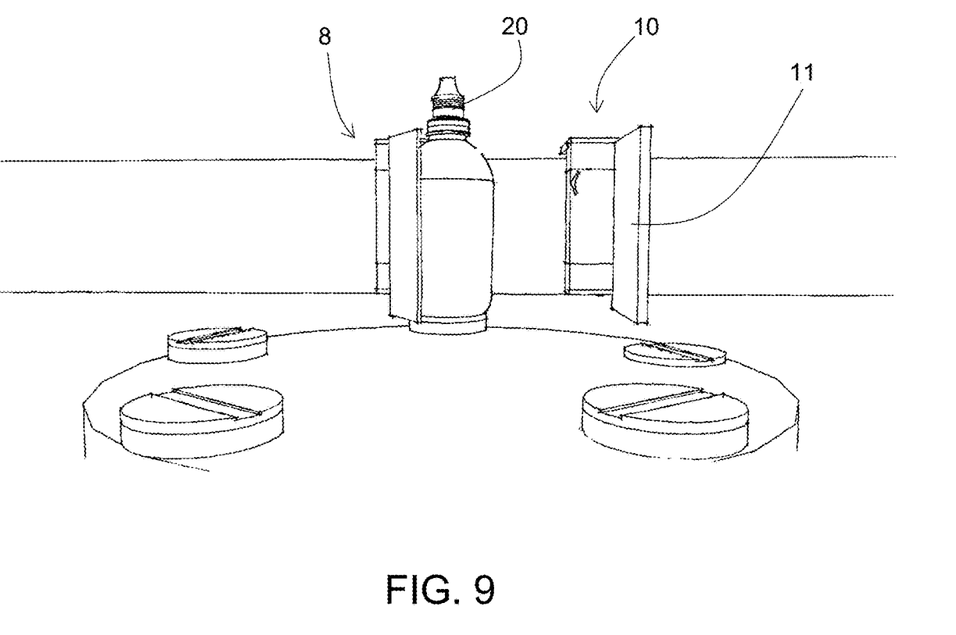
FIGS. 9 and 10 show two successive steps, during which the conveying device of FIG. 8 releases the container to the pick-up device.

In this way, by suitably rotating the supporting plate 16, when the gripping unit 7 reaches the arrival station 4, it is possible to position the supporting plate 16 in the lowered position below the gripping unit 7 with the channel 18 aligned with the supporting portion 13 (FIG. 7). Keeping the gripping unit 7 in the arrival station 4, it is then possible to lift the supporting plate 16 into the raised position in such a way that the contact portions 19, entering the housing 12, lift the container 2 relative to the supporting portion 13. At that point, it is possible to switch the operating portions 9, 11 (that is to say the retaining elements) from the operating configuration to the home configuration, releasing the container 2 which is resting on the supporting plate 16. A subsequent rotation of the carrousel 17 will then bring the container 2 outside the movement path.

If the containers 2 are not stable enough themselves once placed on the supporting plate 16 (for example in the case of bottles), it is also possible for the containers feeding device and/or the containers pick-up device 3 (the one equipped with the supporting plate 16), to also comprise an upper retaining unit 20 vertically aligned with the supporting plate 16 and movable between its own raised position wherein it is placed outside the movement path, and its own lowered position wherein it is partly inserted into the movement path in order to retain an upper part of the container 2 (for example the head of a bottle).

Operation of the conveying device 1 according to this invention, and of the plant which comprises it, derives immediately from the above description and what is illustrated in the appended drawings.

This invention brings important advantages.

First, thanks to this invention it has been possible to develop a type of conveying device for conveying containers, which can be easily adapted to containers of any type and size.

Second, thanks to this invention it has been possible to make a conveying device for conveying containers which can easily be used in plants for processing containers, for transferring the containers from a first device to a second device.

The invention described may be modified and adapted in various ways, without thereby departing from the scope of the inventive concept.

All details may be replaced by other technical equivalents and the materials used, as well as the shapes and dimensions of the various components, may vary depending on requirements.

The invention claimed is:

1. A plant for processing containers (2), comprising a containers feeding device, a containers pick-up device (3) and a conveying device (1) interposed between the containers feeding device and the containers pick-up device (3), for conveying containers (2) along a movement path which extends between a starting station and an arrival station (4) of the plant, wherein the conveying device comprises:
 a fixed supporting unit (5), which extends along a trajectory of extension, and which, along part of its length, extends parallel to the movement path;
 at least one gripping unit (7) slidably associated with the fixed supporting unit (5) for cyclically moving along the trajectory of extension, and configured to retain and move a container (2) along the movement path;
 wherein moreover:

the gripping unit (7) comprises a first retaining element (8) slidably coupled to the fixed supporting unit (5) and comprising a first operating portion (9);

the gripping unit (7) comprises a second retaining element (10) slidably coupled to the fixed supporting unit (5), alongside the first retaining element (8), and comprising a second operating portion (11);

the conveying device comprises respective linear motor actuators for the first retaining element (8) and for the second retaining element (10);

when the first retaining element (8) and the second retaining element (10) move along an operating stretch of the trajectory of extension, the first operating portion (9) and the second operating portion (11) move along the movement path;

the first retaining element (8) and the second retaining element (10) move along the fixed supporting unit (5) independently, by means of the respective linear motor actuators, and, by means of that independent movement, they can switch their reciprocal configuration between an operating configuration, in which the first operating portion (9) and the second operating portion (11) are close together and between them define a housing (12) for a container (2), and a home configuration, in which the first operating portion (9) and the second operating portion (11) are at a distance from each other;

the first operating portion (9) and the second operating portion (11) are in the operating configuration when the first retaining element (8) and the second retaining element (10) move along the operating stretch of the trajectory of extension for moving forward the container (2) along the movement path;

and wherein:

at the starting station, the containers feeding device is coupled to the conveying device (1) in order to position a container (2) between the first operating portion (9) and the second operating portion (11), while the first retaining element (8) and the second retaining element (10) are in the home configuration;

the conveying device (1) is configured to switch the first retaining element (8) and the second retaining element (10) to the operating configuration, while the first operating portion (9) and the second operating portion (11) are still at the starting station and after the containers feeding device has positioned the container (2) between the first operating portion (9) and the second operating portion (11);

at the arrival station (4), the conveying device (1) is configured to switch the first retaining element (8) and the second retaining element (10) to the home configuration;

at the arrival station (4), the conveying device (1) is coupled to the containers pick-up device (3), in order to release, to the containers pick-up device (3), the container (2) contained in the housing (12), when the first retaining element (8) and the second retaining element (10) switch from the operating configuration to the home configuration;

in the operating configuration, the housing (12) is at least partly open at the bottom to allow the insertion into the housing (12) from below, of units suitable for interacting with the container (2) contained in the housing (12);

and wherein respectively the containers feeding device and/or the containers pick-up device (3) comprise a supporting plate (16) couplable at the bottom to the gripping unit (7), respectively, in the starting station and/or in the arrival station (4), and wherein the supporting plate (16) comprises one or more raised or raisable portions which at, respectively, the starting station and/or the arrival station (4) are inserted into the housing (12) from below in order to support the container (2) independently of the gripping unit (7).

2. The plant for processing containers according to claim 1, wherein, respectively, the containers feeding device and/or the containers pick-up device (3) also comprise an upper retaining unit (20) vertically aligned with the supporting plate (16) and movable between a raised position, wherein it is placed outside the movement path, and a lowered position, wherein it is partly inserted into the movement path in order to retain an upper part of the container (2).

3. The plant for processing containers according to claim 1, wherein the first operating portion (9) and the second operating portion (11) are configured to lock between them the container (2) to be moved, when they are in the operating configuration.

4. The plant for processing containers according to claim 1, wherein at least one of the first operating portion (9) or the second operating portion (11), comprises a supporting portion (13) which, in the operating configuration, constitutes a lower support for a container (2) placed in the housing (12) between the first operating portion (9) and the second operating portion (11).

5. The plant for processing containers according to claim 4, wherein the supporting portion (13) comprises one or more projections (14) which extend cantilever-style mainly along a direction parallel to the movement path.

6. The plant for processing containers according to claim 4, wherein the supporting portion (13) is in the shape of a U or C.

7. The plant for processing containers according to claim 4, wherein the supporting portion (13) only partly closes the bottom of the housing (12).

8. The plant for processing containers according to claim 4, wherein the supporting portion (13) is configured to couple respectively to the containers feeding device, at the starting station, and/or to the containers pick-up device (3), at the arrival station (4), respectively allowing the feeding device and/or the pick-up device (3) to interact with the bottom of the container (2), respectively for feeding it to the housing (12) and/or for picking it up from the housing (12).

9. The plant for processing containers according to claim 4, wherein both the first operating portion (9) and the second operating portion (11) comprise a supporting portion (13) which, in the operating configuration, constitutes a lower support for a container (2) placed between the first operating portion (9) and the second operating portion (11).

10. The plant for processing containers according to claim 4, wherein the second retaining element (10) is placed after the first retaining element (8) relative to a direction of forward movement of the container (2) along the movement path, and wherein the second retaining element (10) comprises the supporting portion (13).

11. The plant for processing containers according to claim 1, wherein the housing (12) is completely open at the bottom and the first operating portion (9) and the second operating portion (11) are configured to lock between them the container (2) to be moved by acting exclusively on a lateral surface of the container (2).

12. The plant for processing containers according to claim 1, wherein the first operating portion (9) and the second operating portion (11) are positioned alongside the fixed supporting unit (5).

13. The plant for processing containers according to claim 1 wherein, at least at the starting station and/or the arrival station (4), the conveying device defines an empty space below the first operating portion (9) and the second operating portion (11), for allowing the positioning below the gripping unit (7), respectively, of the containers feeding device and/or of the containers pick-up device (3).

14. The plant for processing containers according to claim 1 comprising a plurality of gripping units (7) mounted one after another on the fixed supporting unit (5), and movable independently of each other along the fixed supporting unit (5).

15. The plant for processing containers according to claim 2, wherein the housing (12) is completely open at the bottom and the first operating portion (9) and the second operating portion (11) are configured to lock between them the container (2) to be moved by acting exclusively on a lateral surface of the container (2).

16. The plant for processing containers according to claim 2, wherein the first operating portion (9) and the second operating portion (11) are positioned alongside the fixed supporting unit (5).

17. The plant for processing containers according to claim 2 wherein, at least at the starting station and/or the arrival station (4), the conveying device defines an empty space below the first operating portion (9) and the second operating portion (11), for allowing the positioning below the gripping unit (7), respectively, of the containers feeding device and/or of the containers pick-up device (3).

18. The plant for processing containers according to claim 2 comprising a plurality of gripping units (7) mounted one after another on the fixed supporting unit (5), and movable independently of each other along the fixed supporting unit (5).

19. The plant for processing containers according to claim 2, wherein the first operating portion (9) and the second operating portion (11) are configured to lock between them the container (2) to be moved, when they are in the operating configuration.

20. The plant for processing containers according to claim 2, wherein at least one of the first operating portion (9) or the second operating portion (11), comprises a supporting portion (13) which, in the operating configuration, constitutes a lower support for a container (2) placed in the housing (12) between the first operating portion (9) and the second operating portion (11).

* * * * *